US012619133B2

(12) United States Patent　　　　　　(10) Patent No.:　US 12,619,133 B2
Maekawa et al.　　　　　　　　　　　　(45) Date of Patent:　　　May 5, 2026

(54) ATTACHMENT MEMBER FOR CAMERA

(71) Applicant: i-PRO CO., LTD., Tokyo (JP)

(72) Inventors: Kento Maekawa, Fukuoka (JP); Koji Abe, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 125 days.

(21) Appl. No.: 18/618,234

(22) Filed: Mar. 27, 2024

(65) Prior Publication Data

US 2024/0329498 A1　　　Oct. 3, 2024

(30) Foreign Application Priority Data

Mar. 31, 2023　(JP) ................................. 2023-058038

(51) Int. Cl.
G03B 17/56　　　　(2021.01)
F16M 13/02　　　　(2006.01)
(52) U.S. Cl.
CPC ........... G03B 17/561 (2013.01); F16M 13/02 (2013.01)
(58) Field of Classification Search
None
See application file for complete search history.

(56) References Cited

U.S. PATENT DOCUMENTS

| | | | | | |
|---|---|---|---|---|---|
| 4,325,529 | A | * | 4/1982 | Seebinger | ................. F16B 2/08 |
| | | | | | 248/219.4 |
| 8,657,508 | B1 | * | 2/2014 | Ferman | ................. F16M 13/022 |
| | | | | | 396/427 |
| 9,400,082 | B2 | * | 7/2016 | Webster | ................. F16M 13/00 |
| 2019/0289262 | A1 | * | 9/2019 | Harms | ................... G06V 20/62 |
| 2020/0185811 | A1 | * | 6/2020 | Willemsen | ............... H01Q 1/44 |

FOREIGN PATENT DOCUMENTS

| | | | | | | |
|---|---|---|---|---|---|---|
| CN | | 114216416 | A | * | 3/2022 | ............. F16M 13/02 |
| DE | | 102015003008 | B4 | * | 10/2020 | ............. F16M 13/02 |
| JP | | 2008-83634 | | | 4/2008 | |
| WO | WO-2021082559 | A1 | * | 5/2021 | ............. F16M 13/02 |

* cited by examiner

*Primary Examiner* — Rodney E Fuller

(74) *Attorney, Agent, or Firm* — Greenblum & Bernstein, P.L.C.

(57)　　　　　ABSTRACT

An attachment member for a camera is attachable to a pole or a wall surface. The attachment member includes a camera attachment portion to which the camera is attachable, a protruding portion whose one end is connected to the camera attachment portion, and a back plate connected to another end of the protruding portion. The protruding portion has a pair of side wall portions formed from the back plate toward the camera attachment portion, the pair of side wall portions have a through hole that allows at least one belt to be inserted, and the back plate has a plurality of fixing holes that allow a plurality of fixing members to be screwed.

7 Claims, 8 Drawing Sheets

ATTACHMENT MEMBER FOR CAMERA

CROSS-REFERENCE TO RELATED APPLICATIONS

This application is based on and claims priority under 35 USC 119 from Japanese Patent Application No. 2023-058038 filed on Mar. 31, 2023, the contents of which are incorporated herein by reference.

TECHNICAL FIELD

The present disclosure relates to an attachment member for a camera.

BACKGROUND ART

In the related art, a fixing device for a camera or the like has been disclosed. The fixing device for a camera or the like includes a camera accommodation portion holding portion for holding a camera accommodation portion for accommodating a camera or the like, a base portion for holding the camera accommodation portion holding portion, and a fixing portion for holding the base portion. The fixing device for a camera or the like includes a first position adjusting unit for adjusting a relative position between the camera accommodation portion and the camera accommodation portion holding portion, a second position adjusting unit for adjusting a relative position between the camera accommodation portion holding portion and the base portion, and a third position adjusting unit for adjusting a relative position between the base portion and a fixing portion. The first to third position adjusting units independently adjust the relative position. The fixing portion has an attachment hole and can be bound to a trunk or a branch of a tree, or the like by using an attachment belt or the like.

CITATION LIST

Patent Literature

Patent Literature 1: JP2008-83634A

SUMMARY OF INVENTION

However, the fixing device for a camera or the like is not intended to be attached to a wall. Therefore, it is necessary to use different attachment devices for a camera or the like for attachment to a cylindrical tree trunk or pole and attachment to a flat wall or the like.

An object of the present disclosure is to provide an attachment member for a camera, which enables a camera to be attached to different attachment targets such as a wall or a pole. The present disclosure provides an attachment member for a camera that is attachable to a pole or a wall surface. The attachment member includes a camera attachment portion to which the camera is attachable, a protruding portion whose one end is connected to the camera attachment portion, and a back plate connected to another end of the protruding portion. The protruding portion has a pair of side wall portions formed from the back plate toward the camera attachment portion, the pair of side wall portions have a through hole that allows at least one belt to be inserted, and the back plate has a plurality of fixing holes that allow a plurality of fixing members to be screwed.

According to the present disclosure, a camera is enabled to be attached to different attachment targets such as a wall or a pole.

DESCRIPTION OF EMBODIMENTS

Hereinafter, embodiments in which an attachment member for a camera according to the present disclosure is specifically disclosed will be described in detail with reference to the drawings as appropriate. However, unnecessarily detailed description may be omitted. For example, detailed description of already well-known matters and redundant description of substantially the same configuration may be omitted. This is to avoid unnecessary redundancy of the following description and facilitate understanding of a person skilled in the art. The accompanying drawings and the following description are provided for a person skilled in the art to sufficiently understand the present disclosure, and are not intended to limit the subject matter described in the claims.

Figure 1:
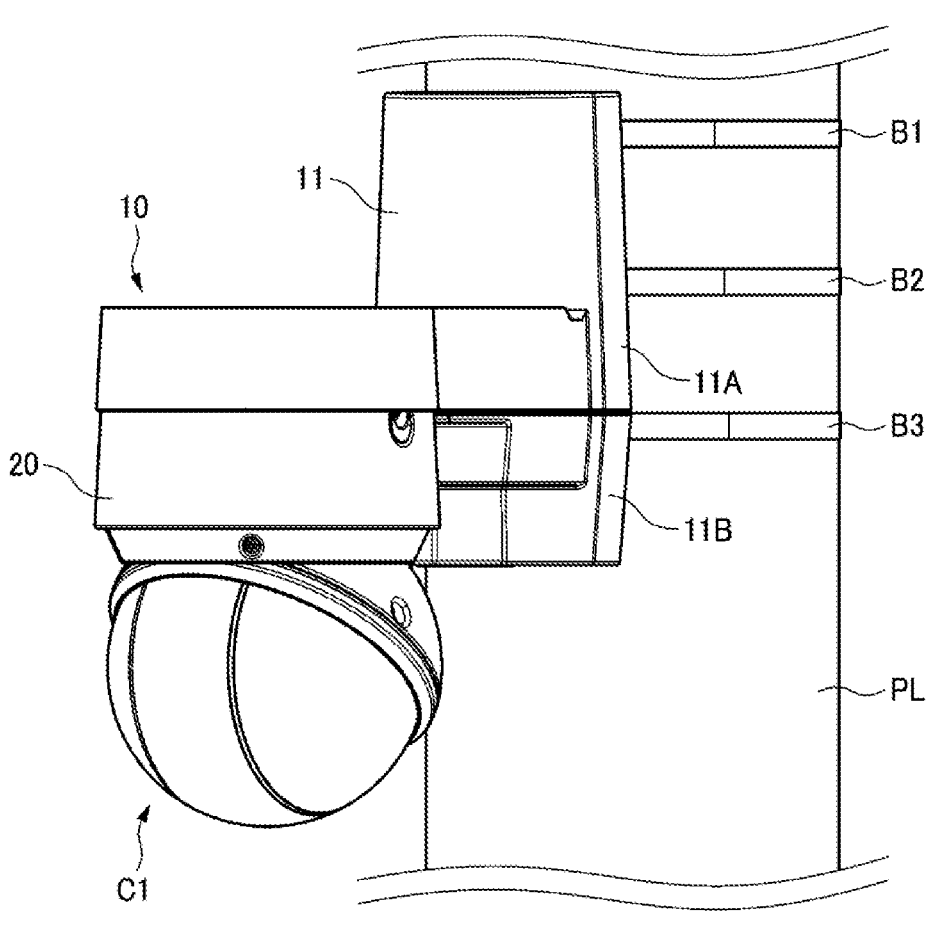
FIG. 1 is an external perspective view of a surveillance camera during attachment to a pole.

First, a surveillance camera C1 and an attachment member 10 during attachment to a pole will be described with reference to FIG. 1. FIG. 1 is an external perspective view of the surveillance camera C1 according to an embodiment.

The surveillance camera C1 (an example of a camera) according to the embodiment is fixed to the attachment member 10 by attaching an attachment portion 20 to attachment holes 17A, 17B, and 17C (see FIG. 4) of a camera attachment portion 12C of the attachment member 10. The surveillance camera C1 is attached to a pole PL or a wall W that is an attachment target (that is, an installation target) via the attachment member 10 by being attached to the attachment member 10, and captures an image in an imaging area that is a surveillance target.

The surveillance camera C1 shown in FIG. 1 may be a so-called monocular camera or a compound eye camera. In addition, an external shape of the surveillance camera C1 shown in FIG. 1 is an example, and the external shape thereof is not limited to the example. For example, the surveillance camera C1 may be a so-called binocular camera in which two camera units (not shown) are arranged in a predetermined direction.

The camera unit referred to herein is an imaging unit for implementing the capture of an image in an imaging area. The camera unit may include a solid-state imaging device such as a charged-coupled device (CCD) or a complementary metal oxide semiconductor (CMOS), and may further include a zoom function, a pan rotation function, or a tilt rotation function.

The attachment member 10 as an example of an attachment member for a camera includes a housing body 11 (an example of a cover member) formed of a resin material, a metal material, or the like, and a base member 12 covered with the housing body 11. The attachment member 10 is attached to the pole PL, which is an attachment target, by three belts B1, B2, and B3 respectively inserted into three sets of through holes 14A, 15A, and 16A described below. Needless to say, the through holes provided in the attachment member 10 are not limited thereto. For example, the attachment member 10 may have at least one set of through holes.

The base member 12 as an example of the attachment member is formed of, for example, a metal material. The base member 12 is integrally formed by connecting a protruding portion 12A, a coupling portion 12B, the camera attachment portion 12C, and a back plate 12D.

Figure 2:
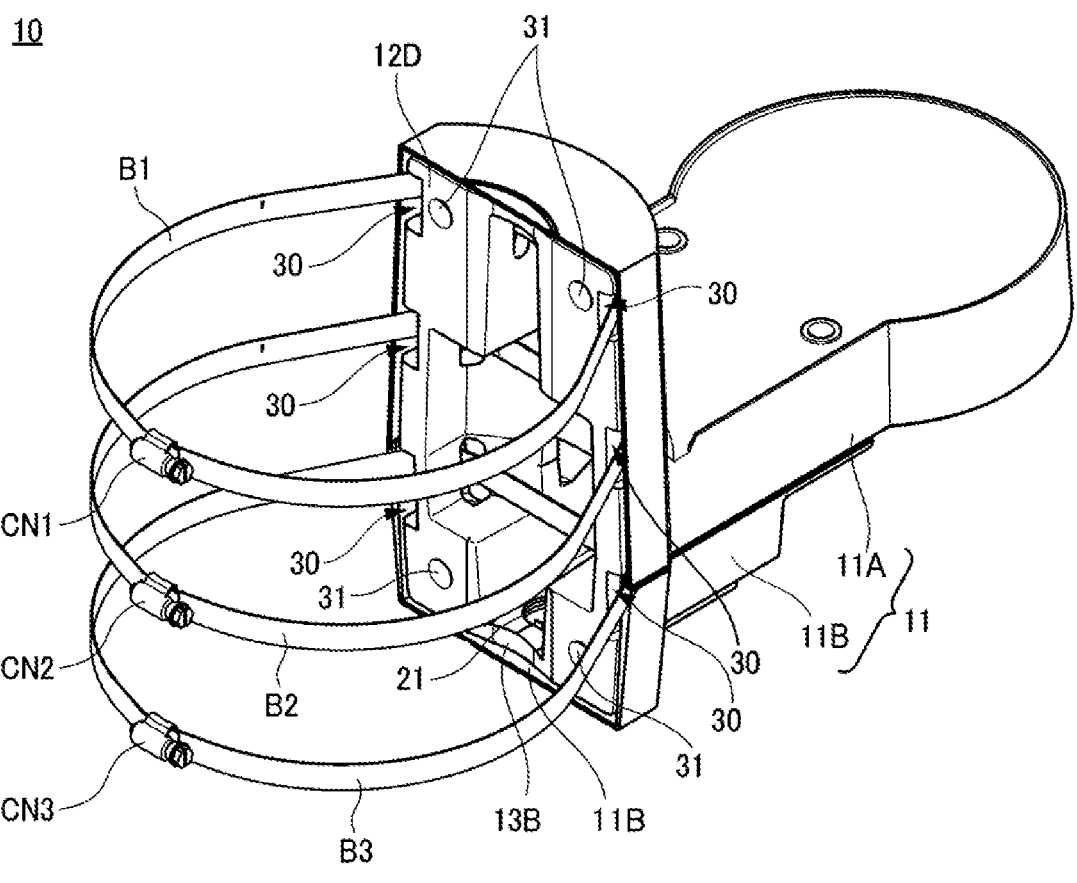
FIG. 2 is a back perspective view of an attachment member during attachment to the pole.
Figure 3:
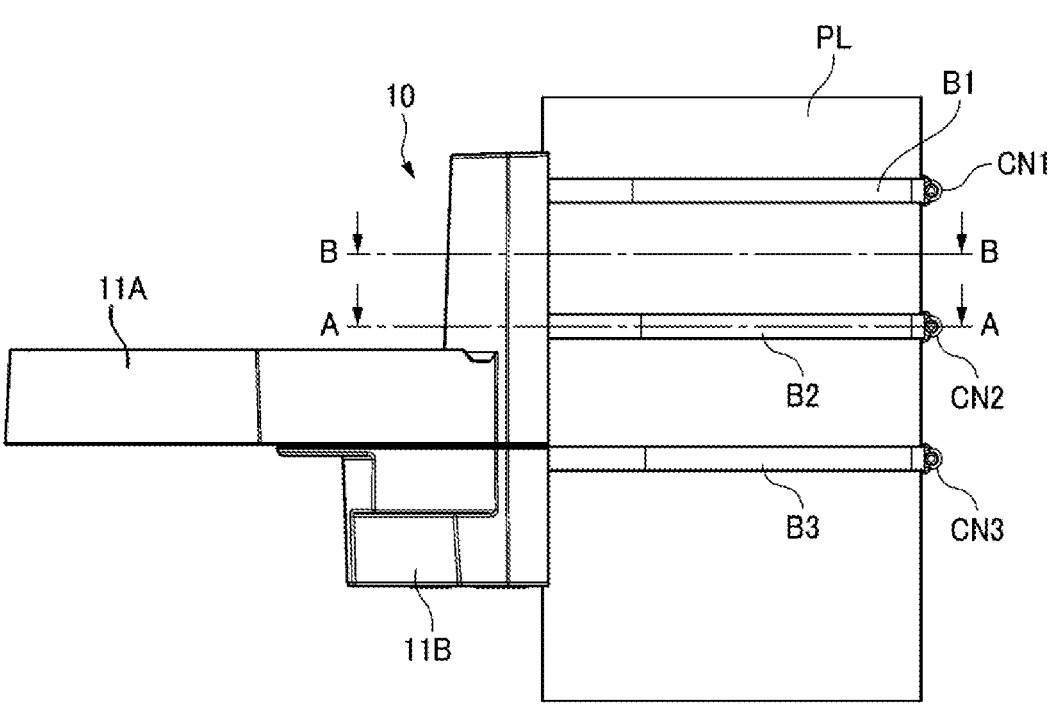
FIG. 3 is a side view of the attachment member during attachment to the pole.

Next, a back structure of the attachment member 10 will be described with reference to FIGS. 2 and 3. FIG. 2 is a back perspective view of the attachment member 10 during attachment to the pole. FIG. 3 is a side view of the attachment member 10 during attachment to the pole. The back surface referred to herein is a contact surface that faces an attachment surface of the pole PL or the wall W (see FIGS. 7 and 8) which is an attachment target and comes into contact with the pole PL or the wall W by attachment using the belts B1 to B3 or screws 32. In FIG. 2, illustrations of the pole PL and the surveillance camera C1 are omitted for easy understanding of the description. In FIG. 3, an illustration of the surveillance camera C1 is omitted for easy understanding of the description.

The attachment member 10 includes the back plate 12D facing the attachment surface of the pole PL or the wall W (see FIGS. 7 and 8) which is an attachment target. The back plate 12D is formed in a substantially rectangular shape.

The surface of the back plate 12D facing the attachment surface is not covered with the housing body 11 and is exposed. That is, a side surface (that is, a front surface 12AF) opposite to the surface facing the attachment surface and an upper side surface 12AA of the back plate 12D are covered with the housing body 11.

In this description, an up-down direction refers to an extension direction of the pole PL, and a left-right direction is a direction perpendicular to the extension direction of the pole PL and parallel to the back plate 12D. A front-rear direction is a direction perpendicular to the extension direction of the pole PL and perpendicular to the back plate 12D.

The back plate 12D includes a pair of recessed portions 13A and 13B (see FIGS. 2 and 4) and a plurality of screw holes 31 (an example of fixing holes).

The pair of recessed portions 13A and 13B are provided at an upper end portion and a lower end portion of the back plate 12D along the extension direction of the pole PL, respectively. In addition, it is preferable that each of the pair of recessed portions 13A and 13B is provided substantially at a center of the back plate 12D in the left-right direction. Each of the pair of recessed portions 13A and 13B has a predetermined curvature and functions as a contact surface that comes into contact with an installation surface (surface) of the pole PL during attachment to the pole.

An opening 21 is formed on a lower surface 12AG (see FIG. 8) of the protruding portion 12A, and allows insertion of a local area network (LAN) cable, a power cable, or the like connected to the surveillance camera C1. A position of the opening 21 is not limited to the lower surface 12AG of the protruding portion 12A, and may be formed on an upper surface 12AC.

The belt B1 is inserted through a pair of through holes 14A respectively formed in upper side surfaces 12AA of the protruding portion 12A. In a state in which the belt B1 is inserted through the pair of through holes 14A, both ends of the belt B1 respectively pass through gaps 18 each formed between the housing body 11 and a respective one of the pair of upper side surfaces 12AA, and are drawn out in a manner of being attachable to the pole PL (not shown).

The belt B2 is inserted through a pair of through holes 15A respectively formed in side surfaces 12AB of the protruding portion 12A. In a state in which the belt B2 is inserted through the pair of through holes 15A, both ends of the belt B2 respectively pass through gaps 18 each formed between the housing body 11 and a respective one of the pair of side surfaces 12AB, and are drawn out in a manner of being attachable to the pole PL (not shown).

The belt B3 is inserted through a pair of through holes 16A respectively formed in the side surfaces 12AB of the protruding portion 12A. In a state in which the belt B3 is inserted through the pair of through holes 16A, both ends of the belt B3 respectively pass through the gaps 18 formed between the housing body 11 and a respective one of the pair of side surfaces 12AB, and are drawn out in a manner of being attachable to the pole PL (not shown).

One end portion and the other end portion, which are drawn out, of each of the three belts B1 to B3 are connected to each other by a corresponding one of connectors CN1, CN2, and CN3 to fix the attachment member 10 to the pole PL in an attachable manner.

As shown in FIG. 2, the back plate 12D may be provided with notches 30, through which the belts B1 to B3 can be inserted, at six locations corresponding to drawn-out positions at which the three belts B1 to B3 are respectively drawn out on both side surfaces in the left-right direction. Accordingly, in the attachment member 10, even when a diameter of the pole PL is smaller, an installation surface (contact surface) of each of the belts B1 to B3 with respect to the pole PL can be larger.

Figure 4:
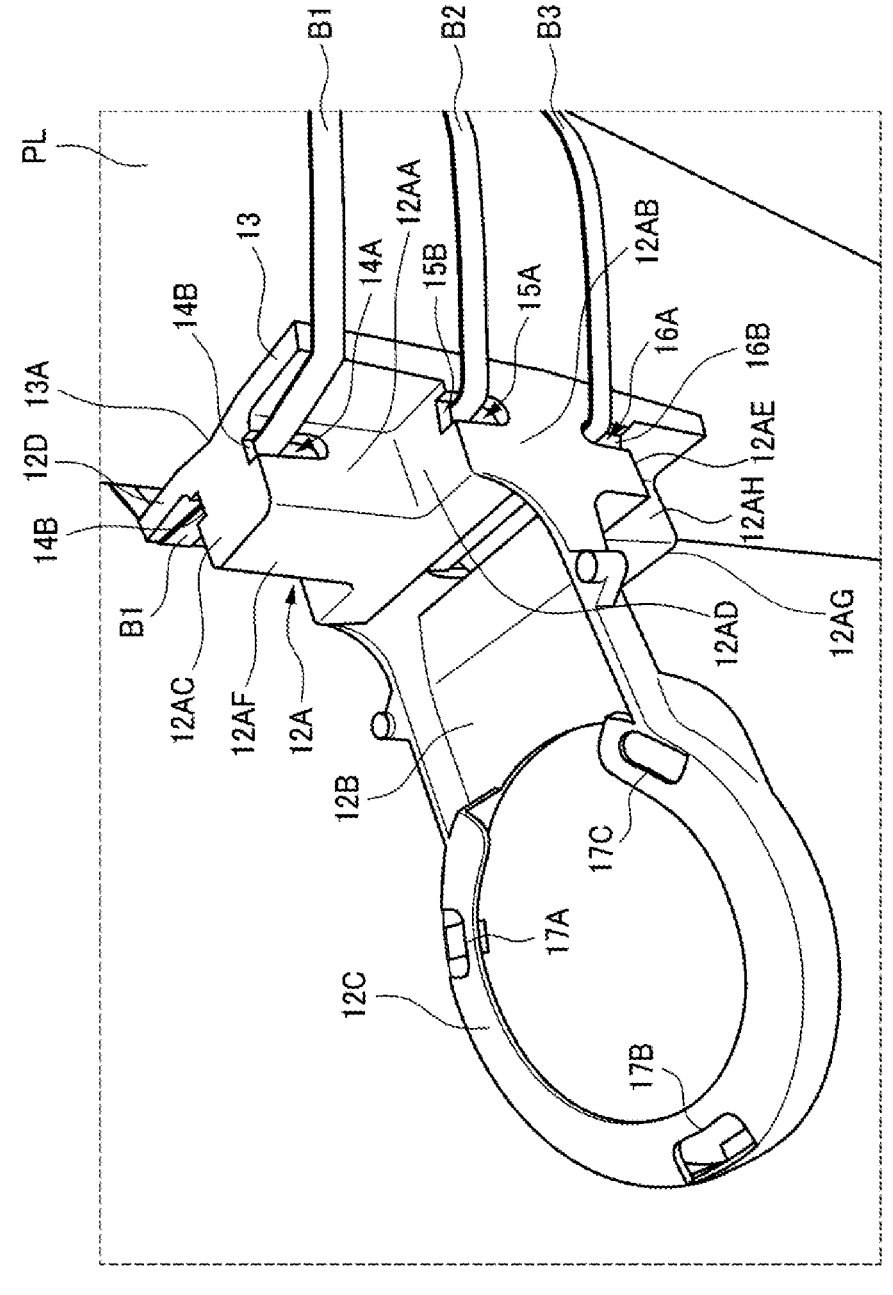
FIG. 4 is a perspective view of a base member during attachment to the pole.

Next, the base member 12 of the attachment member 10 will be described with reference to FIG. 4. FIG. 4 is a perspective view of the base member 12 during attachment to the pole. In FIG. 4, illustrations of the surveillance camera C1 and the housing body 11 are omitted for easy understanding of the description.

The protruding portion 12A is provided between the coupling portion 12B and the back plate 12D, and connects the coupling portion 12B and the back plate 12D. The coupling portion 12B is provided between the protruding portion 12A and the camera attachment portion 12C, and connects (couples) the protruding portion 12A and the camera attachment portion 12C. The camera attachment portion 12C is provided continuously with the coupling portion 12B and is connected to the attachment portion 20 of the surveillance camera C1. The back plate 12D is connected to the protruding portion 12A.

The protruding portion 12A includes a pair of upper side surfaces 12AA and a pair of side surfaces 12AB (an example of a side wall portion), the upper surface 12AC, a pair of intermediate upper surfaces 12AD, a pair of intermediate lower surfaces 12AE, a pair of lower side surfaces 12AH, the front surface 12AF (an example of a front wall portion), and the lower surface 12AG.

Each of the pair of upper side surfaces 12AA and the pair of side surfaces 12AB, the upper surface 12AC, the pair of intermediate upper surfaces 12AD, the pair of intermediate lower surfaces 12AE, the front surface 12AF, and the lower surface 12AG is formed on a side opposite to a surface of the back plate 12D facing the pole PL or the wall W and formed toward a camera attachment portion 12C side of the back plate 12D in the front-rear direction.

The pair of upper side surfaces 12AA and the pair of side surfaces 12AB are formed at different positions in the left-right direction. The pair of side surfaces 12AB are closer to the side surfaces of the back plate 12D in the left-right direction than the pair of upper side surfaces 12AA. Accordingly, for each of the three sets of through holes 14A to 16A, notch portions 14B to 16B can be formed in peripheral edge portions on either side in a direction along the extension direction of the pole PL among peripheral edge portions of the through holes 14A to 16A.

The upper surface 12AC is connected to an upper end side of the front surface 12AF in the up-down direction, and each pair of the pair of upper side surfaces 12AA and the pair of intermediate upper surfaces 12AD is connected to the corresponding two ends of the front surface 12AF in the left-right direction.

One end in the left-right direction of one intermediate upper surface 12AD is connected to a lower end of one upper side surface 12AA, and the other end thereof is connected to an upper end of one side surface 12AB. One end in the front-rear direction of the one intermediate upper surface 12AD is connected to the back plate 12D, and the other end thereof is connected to the front surface 12AF. One end in the left-right direction of the other intermediate upper surface 12AD (not shown) is connected to a lower end of the other upper side surface 12AA (not shown), and the other end thereof is connected to the other side surface 12AB (not shown).

Each of the pair of intermediate lower surfaces 12AE is a surface facing a respective one of the pair of intermediate upper surfaces 12AD. The pair of intermediate lower surfaces 12AE are formed in a manner of extending in the left-right direction. One end in the left-right direction is connected to a lower end of the side surface 12AB, and the other end is connected to an upper end of the lower side surface 12AH. The lower ends of the pair of lower side surfaces 12AH are connected to the lower surface 12AG formed in a manner of extending in the left-right direction.

The camera attachment portion 12C has three attachment holes 17A, 17B, and 17C along a circumferential direction. The attachment portion 20 of the surveillance camera C1 is connected to the three attachment holes 17A, 17B, and 17C so that the surveillance camera C1 can be attached to the attachment member 10.

The protruding portion 12A has a pair of upper side surfaces 12AA connected to the front surface 12AF in the left-right direction. In the protruding portion 12A, one through hole 14A is provided in each of the pair of upper side surfaces 12AA connected to the back plate 12D, and a through hole 15A and a through hole 16A are provided in each of the pair of side surfaces 12AB. Specifically, the belt B1 is inserted through the pair of through holes 14A. The belt B2 is inserted through the pair of through holes 15A. The belt B3 is inserted through the pair of through holes 16A.

The upper surface 12AC is provided with the notch portions 14B at one end and the other end thereof in the left-right direction. The notch portion 14B is continuous with an upper end of the through hole 14A formed in the upper side surface 12AA.

Each of the pair of intermediate upper surfaces 12AD is provided with the notch portion 15B at an end portion on a side to which the side surface 12AB is connected in the left-right direction. The notch portion 15B is continuous with an upper end of the through hole 15A formed in the side surface 12AB.

Each of the pair of intermediate lower surfaces 12AE is provided with the notch portion 16B at an end portion on a side to which the side surface 12AB is connected in the left-right direction. The notch portion 16B is continuous with a lower end of the through hole 16A formed in the side surface 12AB.

Accordingly, in the attachment member 10, the through hole 14A and the notch portion 14B are continuous with each other, and the through hole 15A and the notch portion 15B are continuous with each other, so that rainwater can be prevented from accumulating on the upper surface 12AC or the intermediate upper surface 12AD, and deterioration of the base member 12 due to rust or the like can be more effectively prevented. In the attachment member 10, the through hole 16A and the notch portion 16B are continuous with each other, so that dust or the like is less likely to accumulate on the lower side surface 12AH.

In addition, in the attachment member 10, the rainwater easily flows by each of the notch portions 14B to 16B, and therefore, it is easy to wash out a salt adhering to each of the belts B1 to B3 in an insertion portion of each of the belts B1 to B3 into a respective one of the through holes 14A to 16A. The attachment member 10 is provided with the intermediate upper surface 12AD, and therefore, rainwater also easily flows into the notch portion 16B.

The housing body 11 includes an upper housing body 11A covering an upper side of the attachment member 10 and a lower housing body 11B covering a lower side of the attachment member 10. The upper housing body 11A has an upper side surface and side surfaces. The lower housing body has side surfaces and a lower side surface.

The upper housing body 11A covers an upper side surface of the camera attachment portion 12C, an upper side surface of the coupling portion 12B, the front surface 12AF, the upper surface 12AC, the upper side surfaces 12AA, the intermediate upper surfaces 12AD, a portion of the side surface 12AB above a lower end of a side surface of the coupling portion 12B and above a lower end of the coupling portion 12B, and a front surface (surface opposite to the attachment surface) and a side surface of the back plate 12D located above the lower end of the side surface of the coupling portion 12B.

The lower housing body 11B covers a lower side surface of the coupling portion 12B, a portion of the side surface 12AB below the lower end of the side surface of the coupling portion 12B, the intermediate lower surfaces 12AE, the lower side surfaces 12AH, the lower surface 12AG, and the front surface (surface opposite to the attachment surface) and the side surface of the back plate 12D located below the lower end of the side surface of the coupling portion 12B.

The opening 21 is provided in a lower surface of the lower housing body 11B.

The upper housing body 11A and the lower housing body 11B have portions overlapping each other on the side surfaces in a combined state. More specifically, a piece extending downward from a lower end of a side surface combined with the lower housing body 11B is provided in the upper housing body 11A, and covers an outer side surface of a cut-out portion of an upper end of the lower housing body 11B.

In the attachment member 10, normally, the upper side surface of the upper housing body 11A covers the recessed portion 13A of the back plate 12D, and the lower housing body 11B covers the recessed portion 13B of the back plate 12D. Each of them is covered. When the attachment member 10 is attached to the pole, a part of the upper side surface of the upper housing body 11A covering the recessed portion 13A and a part of the lower housing body 11B covering the recessed portion 13B are cut off by a person who performs the attachment. Accordingly, in the attachment member 10, each of the pair of recessed portions 13A and 13B can abut against the attachment surface of the pole PL.

Figure 5:
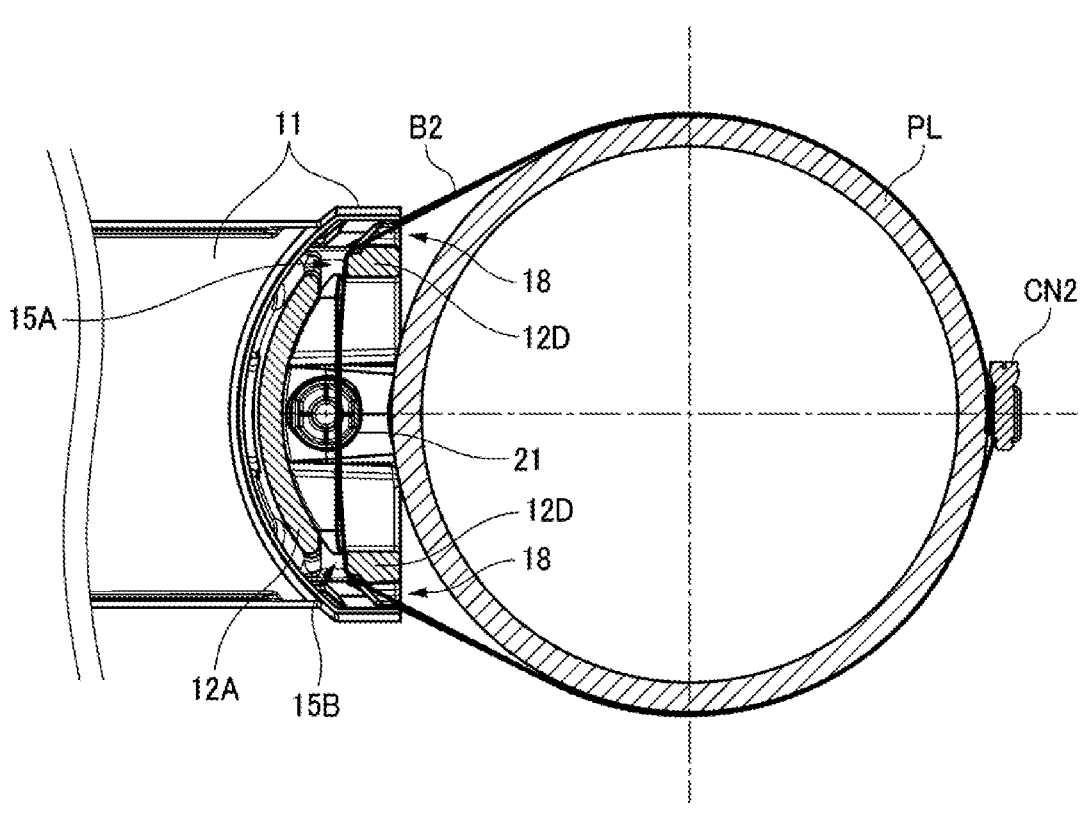
FIG. 5 is a cross-sectional view of the attachment member shown in FIG. 3, which is taken along a line A-A.
Figure 6:
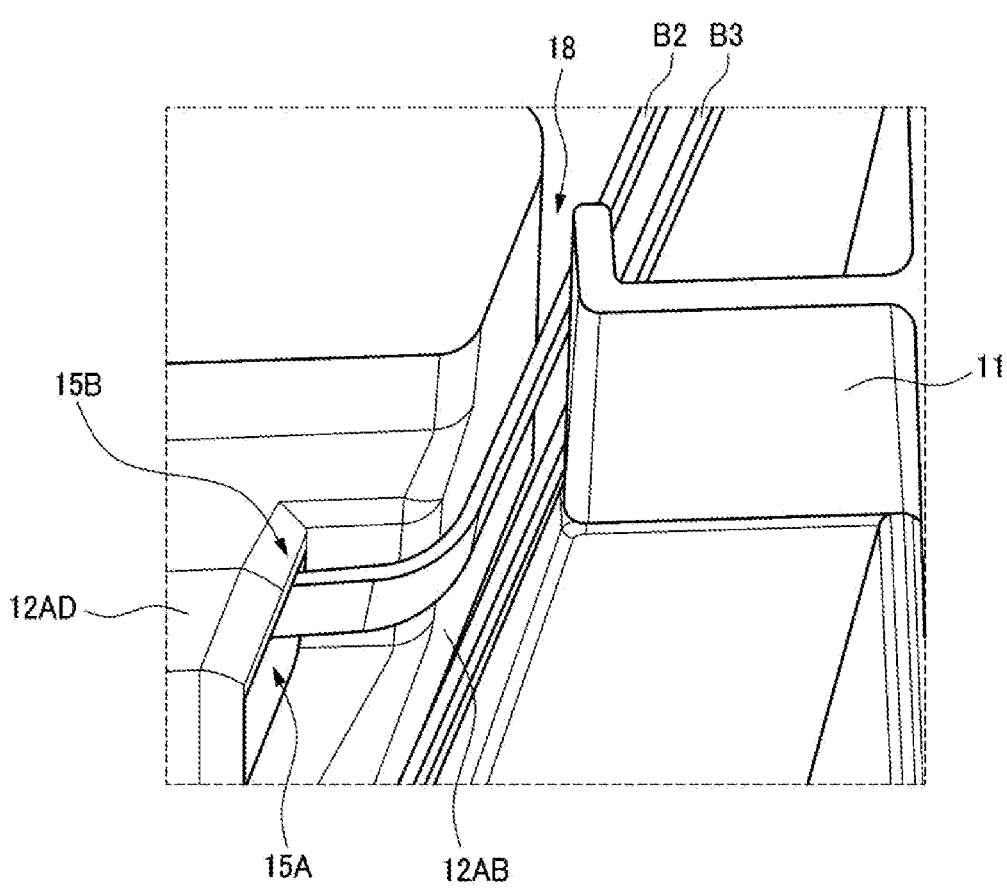
FIG. 6 is a cross-sectional view of the attachment member shown in FIG. 3, which is taken along a line B-B.

Next, a drawn-out structure of the belt B2 will be described with reference to FIGS. 5 and 6. FIG. 5 is a cross-sectional view of the attachment member 10 shown in FIG. 3, which is taken along a line A-A. FIG. 6 is a cross-sectional view of the attachment member 10 shown in FIG. 3, which is taken along a line B-B. In the examples shown in FIGS. 5 and 6, the drawn-out structure of the belt B2 will be described as an example. The belts B1 and B3 are also substantially the same, and thus description thereof will be omitted.

The belt B2 inserted through the pair of through holes 15A passes through a gap 18 (an example of a gap) between the housing body 11 and the side surface of the back plate 12D in the left-right direction, and both ends of the belt B2 are drawn out of the housing body 11 from an inside of the housing body 11. The belt B2 is drawn out in a manner of being attachable to the pole PL (not shown).

Figure 7:
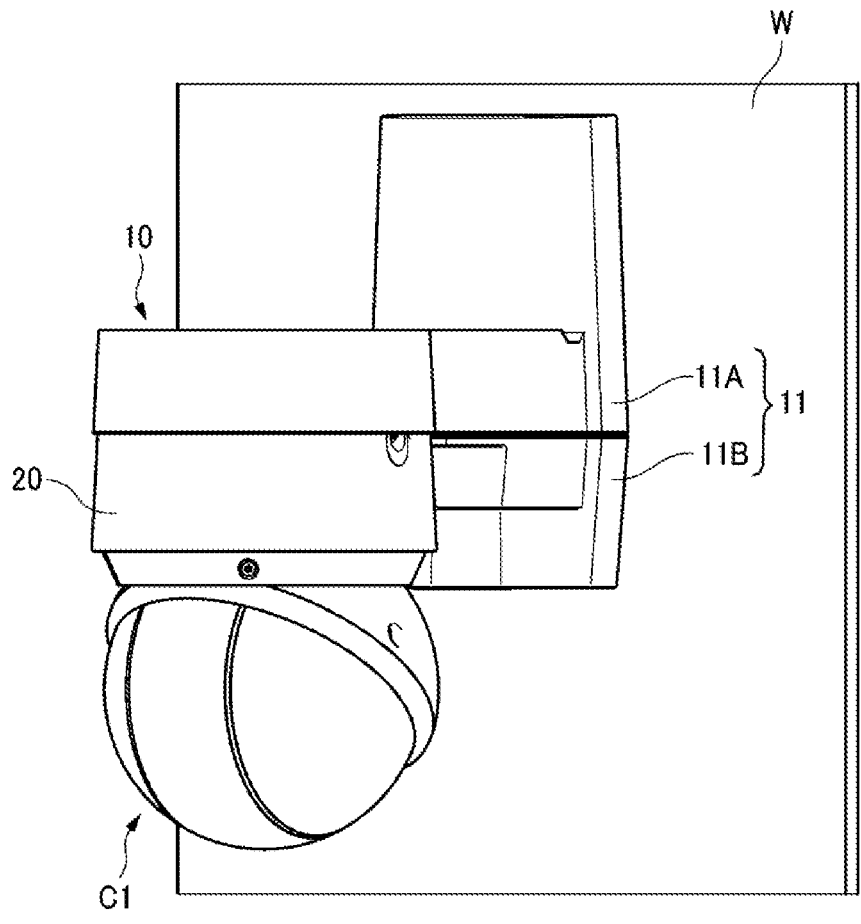
FIG. 7 is an external perspective view of the surveillance camera during attachment to a wall surface.
Figure 8:
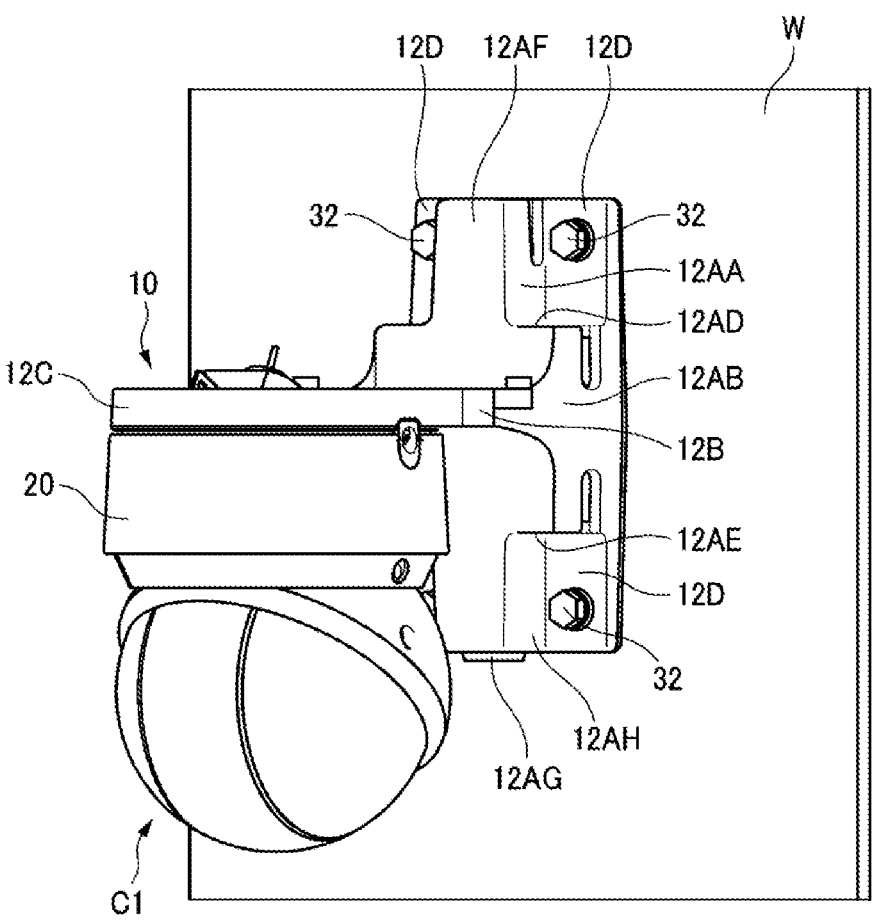
FIG. 8 is a perspective view of the base member during attachment to the wall surface.

Next, the surveillance camera C1 and the attachment member 10 during attachment to a wall surface will be described with reference to FIGS. 7 and 8. FIG. 7 is an external perspective view of the surveillance camera C1 during attachment to the wall surface. FIG. 8 is a perspective view of the base member 12 during attachment to the wall surface. Note that an illustration of the housing body 11 of the attachment member 10 shown in FIG. 8 is omitted for easy understanding of the description.

The back plate 12D of the base member 12 is a surface facing the wall W, and a surface to be in contact with the wall W is formed as a substantially horizontal surface. In the base member 12, a plurality of screws 32 (an example of a fixing member) are respectively screwed to a plurality of screw holes 31 provided in the back plate 12D, so that the back plate 12D and a wall surface of the wall W come into contact with each other, and the attachment member 10 is attached to the wall W.

As described above, the attachment member 10 (an example of an attachment member of a camera) according to the embodiment can be attached to the pole PL or the wall surface, and includes the camera attachment portion 12C to which the surveillance camera C1 (an example of the camera) can be attached, the protruding portion 12A whose one end side is connected to the camera attachment portion 12C, and the back plate 12D connected to the other end of the protruding portion 12A. The protruding portion 12A has the pair of upper side surfaces 12AA (an example of the side wall portion) and the pair of side surfaces 12AB (an example of the side wall portion) formed from the back plate 12D toward the camera attachment portion 12C. The pair of upper side surfaces 12AA and the pair of side surfaces 12AB have through holes 14A to 16A through which at least one of the belts B1 to B3 can be inserted. The back plate 12D has a plurality of screw holes 31 (an example of fixing holes) into which a plurality of screws 32 (an example of fixing members) can be respectively screwed.

Accordingly, the surveillance camera C1 can be attached to either one of the pole PL and the wall surface by the attachment member 10 according to the embodiment.

The back plate 12D of the attachment member 10 according to the embodiment has the recessed portions 13A and 13B which can come into contact with a surface of the pole PL. Accordingly, in the attachment member 10 according to the embodiment, when the surveillance camera C1 is attached to the pole PL, an attachment position of the attachment portion 20 can be determined by bringing the recessed portions 13A and 13B into contact with the surface of the pole PL.

The attachment member 10 according to the embodiment has the upper surface 12AC connecting the upper ends of the pair of upper side surfaces 12AA. The through hole 14A is opened to an upper end side of each of the pair of upper side surfaces 12AA, and the notch 14B (an example of a notch) continuous with the through hole 14A is provided in the upper surface 12AC. Accordingly, in the attachment member 10 according to the embodiment, water droplets such as rainwater is less likely to accumulate on the upper surface 12AC, and a salt adhering to the belt B1 is easily washed away with the water droplets. Therefore, in the attachment member 10, deterioration of the base member 12 due to water droplets and the salt can be more effectively prevented.

The protruding portion 12A of the attachment member 10 according to the embodiment has the front surface 12AF (an example of a front wall portion) that connects the pair of upper side surfaces 12AA and the pair of side surfaces 12AB. The front surface 12AF, the upper side surface 12AA, and the side surfaces 12AB are covered with the housing body 11 (an example of a cover member). Accordingly, in the attachment member 10 according to the embodiment, ion dust (dust, sand, leaves, or the like) can be more effectively prevented from accumulating on the upper side surface 12AA and the side surface 12AB in which the through holes 14A to 16A are formed, the upper surface 12AC, and the intermediate upper surface 12AD.

In addition, the housing body 11 of the attachment member 10 according to the embodiment covers the through holes 14A to 16A. Accordingly, in the attachment member 10 according to the embodiment, dust (dust, sand, leaves, or the like) can be more effectively prevented from accumulating in the through holes 14A to 16A.

The gaps 18 (an example of a gap) through which the belts B1 to B3 can be respectively inserted are formed between the housing body 11 and the pair of upper side surfaces 12AA and the pair of side surfaces 12AB of the attachment member 10 according to the embodiment. Accordingly, in the attachment member 10 according to the embodiment, each of the belts B1 to B3 inserted through a respective one of the through holes 14A to 16A can be drawn out of the housing body 11, and attachment to the pole PL by each of the belts B1 to B3 can be implemented.

The housing body 11 of the attachment member 10 according to the embodiment covers the back plate 12D. The gap 18 through which the belts B1 to B3 can pass is formed between the side surface of the back plate 12D and the housing body 11. Accordingly, the housing body 11 of the attachment member 10 according to the embodiment can be attached to the pole PL.

The pair of side surfaces of the attachment member 10 according to the embodiment include the upper side surfaces 12AA and the side surfaces 12AB (an example of the intermediate side surface), and the intermediate upper surface 12AD connecting the lower end of the upper side surface 12AA and the upper end of the side surface 12AB is provided. The through hole 15A (an example of an intermediate through hole) having an opened upper end is provided at the upper end of the side surface 12AB. The notch portion 15B (an example of a notch) continuous with the upper end of the through hole 15A is formed in the intermediate upper surface 12AD. Accordingly, in the attachment member 10 according to the embodiment, water droplets such as rainwater are less likely to accumulate on the intermediate upper surface 12AD, and a salt adhering to the belt B2 inserted through the through hole 15A is easily washed away with the water droplets. Therefore, in the attachment member 10, deterioration of the base member 12 due to water droplets and the salt can be more effectively prevented.

Various embodiments have been described above with reference to the drawings, but the present disclosure is not limited thereto. It is apparent to a person skilled in the art that various changes, modifications, substitutions, additions, deletions, and equivalents can be conceived within the scope of the claims, and it is understood that such modifications also belong to the technical scope of the present disclosure. The respective components in the various embodiments above described may be optionally combined without departing from the gist of the invention.

INDUSTRIAL APPLICABILITY

The present disclosure is useful as an attachment member for a camera, which enables the camera to be attached to different attachment targets such as a wall or a pole.

What is claimed is:

1. An attachment member for a camera that is attachable to a pole or a wall surface, the attachment member comprising:
   a camera attachment portion to which the camera is attachable;
   a protruding portion whose one end is connected to the camera attachment portion; and
   a back plate connected to another end of the protruding portion,
   wherein the protruding portion has a pair of side wall portions formed from the back plate toward the camera attachment portion,
   the pair of side wall portions have a through hole that allows at least one belt to be inserted, the back plate has a plurality of fixing holes that allow a plurality of fixing members to be screwed,
   the protruding portion has an upper surface connecting upper ends of the pair of side wall portions,
   the through hole is opened to an upper end side of each of the pair of side wall portions, and
   the upper surface is provided with a notch continuous with the through hole.

2. The attachment member for a camera according to claim 1,
   wherein the back plate has a recessed portion that comes into contact with a surface of the pole.

3. The attachment member for a camera according to claim 1,
   wherein the protruding portion has a front wall portion connecting the pair of side wall portions, and
   the front wall portion and the side wall portions are covered with a cover member.

4. The attachment member for a camera according to claim 3,
   wherein the cover member covers the through hole.

5. The attachment member for a camera according to claim 3,
   wherein a gap that allows the belt to be inserted is provided between each of the pair of side wall portions and the cover member.

6. The attachment member for a camera according to claim 3,
   wherein the cover member covers the back plate, and
   a gap that allows the belt to pass through is provided between a side surface portion of the back plate and the cover member.

7. The attachment member for a camera according to claim 1,
   wherein the pair of side wall portions have an upper side surface and an intermediate side surface, an intermediate upper surface connecting a lower end of the upper side surface and an upper end of the intermediate side surface is provided,
   the upper end of the intermediate side surface is provided with an intermediate through hole having an opened upper end, and
   the intermediate upper surface is provided with a notch continuous with an upper end of the intermediate through hole.

* * * * *